(12) United States Patent
Ferling et al.

(10) Patent No.: US 8,006,376 B2
(45) Date of Patent: Aug. 30, 2011

(54) METHOD FOR ASSEMBLY OF AN LED LIGHT

(75) Inventors: Sonja Ferling, Paderborn (DE); Sascha Lüder, Rietberg (DE); Martin Griesbach, Unna (DE); Andre Hessling, Vallendar (DE)

(73) Assignee: Goodrich Lighting Systems GmbH, Lippstadt (DE)

( * ) Notice: Subject to any disclaimer, the term of this patent is extended or adjusted under 35 U.S.C. 154(b) by 95 days.

(21) Appl. No.: 12/125,645

(22) Filed: May 22, 2008

(65) Prior Publication Data

US 2009/0025202 A1    Jan. 29, 2009

Related U.S. Application Data

(60) Provisional application No. 60/939,516, filed on May 22, 2007.

(30) Foreign Application Priority Data

May 22, 2007 (EP) ..................................... 07108613
Feb. 18, 2008 (EP) ..................................... 08101709

(51) Int. Cl.
*H05K 3/30* (2006.01)
*B60Q 1/00* (2006.01)
*B60Q 1/26* (2006.01)

(52) U.S. Cl. ............................. 29/834; 29/832; 362/487

(58) Field of Classification Search ................. 29/592.1, 29/832–834, 876–877; 362/612, 555, 545, 362/249.02, 311.02, 800, 487; 315/368.19, 315/407
See application file for complete search history.

(56) References Cited

U.S. PATENT DOCUMENTS

| | | | | |
|---|---|---|---|---|
| 4,237,474 A * | 12/1980 | Ladany | ........................... | 385/49 |
| 4,500,165 A * | 2/1985 | Scholl et al. | ..................... | 385/90 |
| 5,177,807 A * | 1/1993 | Avelange et al. | ................ | 385/91 |
| 2008/0074884 A1* | 3/2008 | Mok et al. | ...................... | 362/294 |

FOREIGN PATENT DOCUMENTS

EP        0420214        4/1991

(Continued)

OTHER PUBLICATIONS

Search Report for corresponding application No. EP 08101709 dated Jul. 7, 2008.

*Primary Examiner* — A. Dexter Tugbang
*Assistant Examiner* — David P Angwin
(74) *Attorney, Agent, or Firm* — Renner, Otto, Boisselle & Sklar, LLP

(57) ABSTRACT

The method for assembly of an LED lighting device comprising an LED module and a reflective and/or refractive optical unit and provided particularly as a reading or seat light for use in a vehicle such as, e.g., an airplane, a train or a bus, comprises the following steps:

providing an LED module (12) comprising at least one LED (22),
providing a reflective and/or refractive optical unit (14) for illuminating a measuring plane by use of electromagnetic radiation from the LED module (12) and with the aid of said optical unit,
arranging the optical unit (14) and the LED module (12) for later fixation to each other,
driving the LED module (12) to cause it to emit electromagnetic radiation for illuminating a measuring plane,
detecting at least a part of the electromagnetic radiation of the LED module (12) that is incident on the measuring plane, by use of a detector (18),
moving the LED module (12) relative to the optical unit (14) and/or the optical unit (14) relative to the LED module (12) along the optical axis (16), until the detector (18) detects electromagnetic radiation of the LED module (12) of a presettable intensity, and
fixing the optical unit (14) and the LED module (12) relative to each other in their current relative positions.

4 Claims, 1 Drawing Sheet

FOREIGN PATENT DOCUMENTS

| | | |
|---|---|---|
| EP | 0481877 | 4/1992 |
| FR | 2767928 | 9/1997 |
| FR | 2767928 * | 3/1999 |
| WO | 01/02775 | 1/2001 |

* cited by examiner

METHOD FOR ASSEMBLY OF AN LED LIGHT

RELATED APPLICATIONS

This application claims priority of U.S. Provisional Application No. 60/939,516 filed May 22, 2007, European Patent Application No. 07108613.6 filed May 22, 2007, and European Patent Application No. 0801709.7 filed Feb. 18, 2008, all of which are hereby incorporated herein by reference in their entireties.

BACKGROUND

1. Field of the Invention

The present invention relates to method for assembly of an LED lighting device which can be, for instance, a reading or seat light for use in a vehicle such as, e.g. an airplane, a train or a bus, and which comprises an LED module and an optical unit which can be of the reflective type (e.g. a reflector) and/or the refractive type (e.g. a lens).

2. Related Prior Art

The specification of lighting devices usually includes requirements with regard to brightness, color, and light distribution. Lighting devices comprise, apart from an illuminant, also optical systems; to be counted among these are reflectors and/or lenses, for instance. Optical systems should be as small-sized as possible so that the lighting device can be designed to have a small constructional depth.

As illuminants for reading or seat lights in vehicles such as, e.g., airplanes, increasing use is made of LEDs because of their easy maintenance and their long useful life.

In many commercially available LEDs, the dies have relatively large positional tolerances, particularly in the direction of the optical axis. Also the optical systems used for the lighting devices are subject to tolerances with respect to their position, their shape and their optical characteristics, notably under the aspect of efficiency, gloss level and imaging accuracy.

In optoelectronic systems for the coupling of electromagnetic radiation of an LED or laser diode into an optical fiber, it is known to displace the fibers along their axes relative to the LED and respectively laser diode until the coupled-in radiation intensity will correspond to a preset value. Examples thereof are found in FR-A-2 767 928, U.S. Pat. No. 4,237,474, U.S. Pat. No. 4,500,165 and U.S. Pat. No. 5,177,807. These known systems, however, are not suited for the assembly process of LED lights provided for illumination of surfaces or spaces, as is the case in reading or seat lights for use in a vehicle such as, e.g. an airplane, a train or a bus.

It is an object of the invention to improve the assembly process for LED lights to the effect that the parts-reject rate is reduced.

SUMMARY OF THE INVENTION

According to the present invention, to achieve the above object, there is provided a method for assembly of an LED lighting device comprising an LED module and a reflective and/or refractive optical unit and provided, e.g., as a reading or seat light for use in a vehicle such as, e.g., an airplane, a train or a bus, said method comprising the steps of:

providing an LED module comprising at least one LED,
providing a reflective and/or refractive optical unit for illuminating a measuring plane by use of electromagnetic radiation from the LED module and with the aid of said optical unit,
arranging the optical unit and the LED module for later fixation to each other,
driving the LED module to cause it to emit electromagnetic radiation for illuminating a measuring plane (e.g. visible light or, for special uses, UV or IR radiation),
detecting at least a part of the electromagnetic radiation of the LED module that is incident on the measuring plane, by use of a detector,
moving the LED module relative to the optical unit and/or the optical unit relative to the LED module along the optical axis, until the detector detects electromagnetic radiation of the LED module of a pre-settable intensity, and
fixing the optical unit and the LED module relative to each other in their current relative positions.

In the assembly process of an LED lighting device, it is according to the method of the invention provided that, for obtaining a desired light intensity, the LED module and the optical unit of the LED lighting device are moved relative to each other in a predefined distance from the LED lighting device along the optical axis of the LED lighting device until a relative position of both components has been found where the desired light intensity is produced. In the process, an LED module comprising at least one LED, and an optical unit comprising a refractive and/or a reflective element are arranged along the optical axis of the LED lighting device for later fixation. The LED module is driven to emit electromagnetic radiation which, with the aid of the optical unit, is used for illuminating a measuring surface. Using a detector, this radiation is at least partially detected. Thereafter, a relative movement of the said components of the LED lighting device is brought about, namely until the detector detects a radiation intensity which corresponds to the desired radiation intensity at the desired distance from the LED lighting device. In that relative position of both components where this radiation intensity is accomplished, the components will be fixed to each other, so that the assembly process for the LED lighting device is completed.

By the inventive method, it is particularly made possible to compensate for positional tolerances along the optical axis both of the LED module and of the optical unit. The assembly process can be carried out automatically. The fixing of said two components relative to each other can be performed by the presently usual methods, i.e. with the aid of corresponding connection elements or by bonding.

Suitably, the permanent connection between both components of the LED lighting device is effected by use of a curable adhesive mass. This adhesive mass can be applied when, during the measuring phase of the inventive assembly method, the relative positioning of the two components that corresponds to the desired light intensity has been found. Curing the adhesive mass is preferably performed by UV radiation. Also other are types of curing processes are possible, such as e.g. curing by exposing the adhesive mass to ambient air.

Suitably, however, prior to the displacement of the two components relative to each other along the optical axis, the adhesive mass should be applied to mechanical contact sites between the LED module and the optical unit. In doing so, a mechanical contact between the LED module and the optical unit is established by the adhesive mass at the beginning of the relative positioning. For this purpose, the two components can be moved towards each other so the connection sites of the optical unit will be immersed into the adhesive mass if the latter has been applied onto the LED module before. Alternatively, the connection sites of the LED module will be contacted with the adhesive mass if the latter has been applied onto the contact sites of the optical unit before. When, subsequently, the two components are moved relative to each other along the optical axis for detecting the required relative positions for the desired light intensity, the mutual contact sites of the LED module and the optical unit will always remain connected to the adhesive mass which, by being "lengthened", extends between the two components. By allowing the adhesive mass to cure or by curing it with the aid of UV radiation, both components can then be fixed to each other in the required relative positions.

Further useful for an automatic quality assurance are the integration of temperature sensors monitoring the heating of the LEDs and thus detecting a correct thermal coupling, as well as an automated monitoring of the used components by optical and electric checking methods and by the checking of chromaticity coordinates as performed in a control computer for the respective device and lighting-device types.

The LED lighting device produced according to the invention can be used e.g. for illumination purposes, with the lighting device emitting light in the visible range. However, the inventive method is also useful for LED lighting devices which, for instance, emit radiation other than visible light, e.g. UV or IR radiation.

The invention will be explained in greater detail hereunder in connection of an embodiment thereof and with reference to the drawings.

DETAILED DESCRIPTION OF A PREFERRED EMBODIMENT

Figure 1:
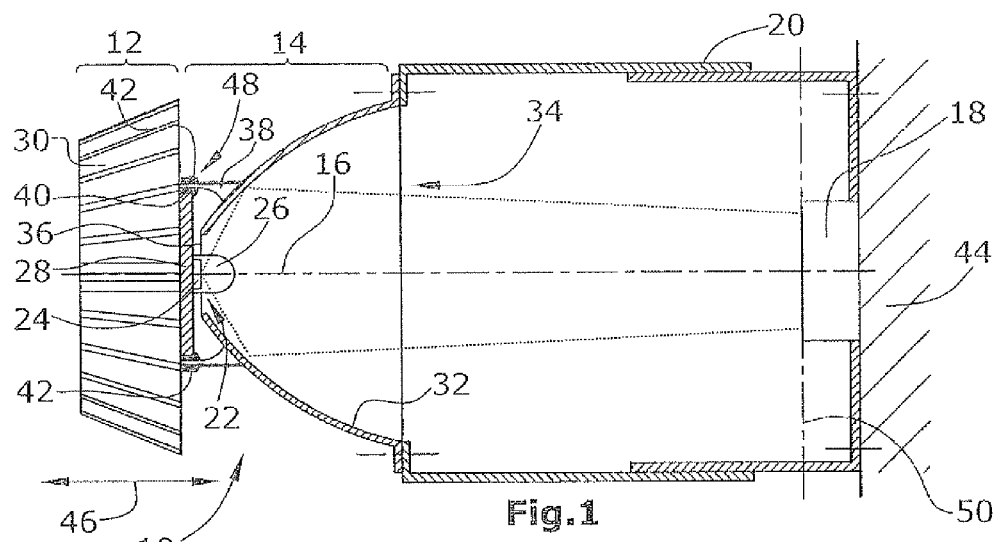
FIG. 1 is a schematic representation of the measuring and assembly arrangement in the initial phase of the assembly process of the components of the LED lighting device which have to be fixed to each other.
Figure 2:
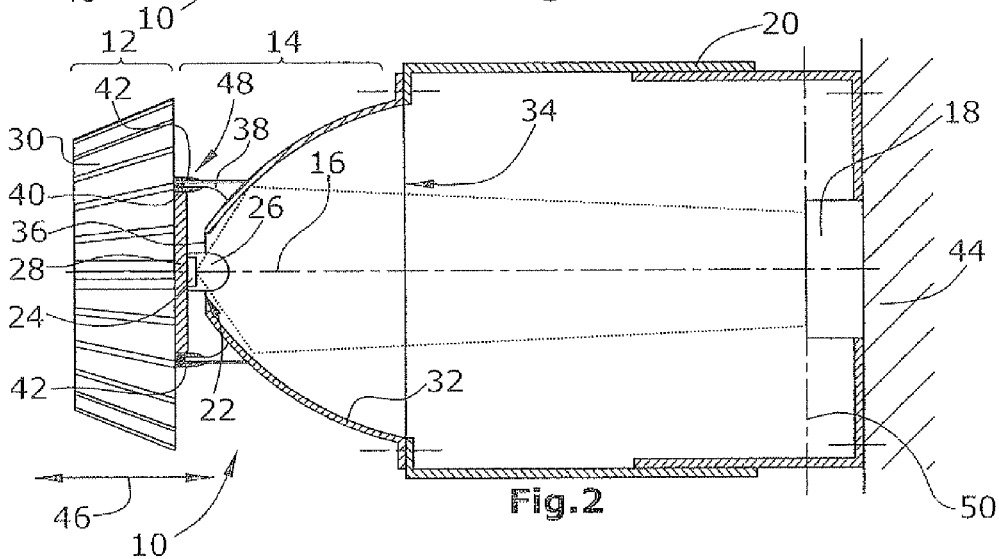
FIG. 2 is a representation of the assembly arrangement in which both components are arranged in a relative position to compensate for their tolerances.
Figure 3:
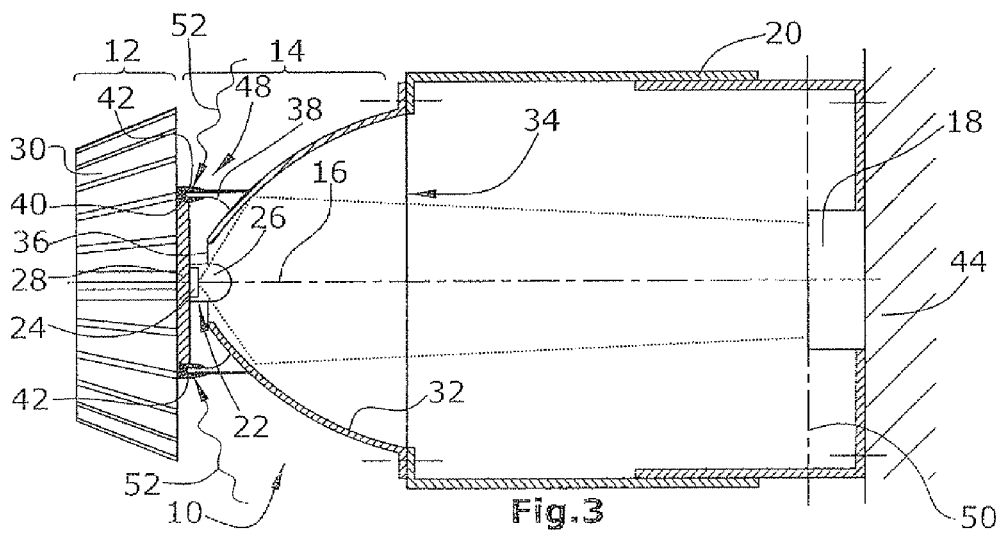
FIG. 3 is a representation of the assembly arrangement in the state where the adhesive mass for fixation of the two components relative to each other has been cured.

FIGS. 1 to 3 schematically illustrate an assembly and measuring arrangement for automatic fixation of two components of an LED lighting device. The LED lighting device 10 comprises a LED module 12 and an optical unit 14. These two components of LED lighting device 10 are subject to tolerances. To nonetheless be able to achieve a required light intensity at a required distance from the LED lighting device 10, it is provided that, during the assembly process, the two components are displaced relative to each other along the optical axis 16 of LED lighting device 10 until, by means of a detector 18, a relative position corresponding to the required light intensity has been found. Detector 18 is located internally of a preferably telescopable tube 20, with detector 18 arranged on one end of said tube 20 and optical unit 14 arranged on the opposite, other end of tube 20. Tube 20 is preferably telescopable in order to make it possible, with the aid of the measuring arrangement, to measure LED lighting devices 10 which are desired to have predefined light intensities at different distances. Thus, the distance of the detector 18 to the LED lighting device 10 can be adjusted by telescoping the tube 20.

The LED module 12 comprises an LED 22 including a die 24 and a transparent casting mass 26. Said LED is arranged on a board 28 which is optionally provided with components for driving the LED 22 and with contact elements for electric contacting. Board 28 is arranged on a cooling body 30.

In the present embodiment, optical unit 14 comprises a reflector 32 provided with a light exit opening 34 and an LED receiving opening 36. On its end comprising the opening 36, the reflector 32 is provided with connection webs 38—three in the present embodiment—which are distributed at uniform distances along the circumference of the rotationally symmetric reflector 32. Assigned to these connection webs 38 are three recesses 40 formed in board 28. Into these recesses, adhesive mass 42 will be applied for immersion of the ends of the connection webs 38 thereinto during the assembly process of the LED lighting device 10.

During the assembly and measuring processes of LED lighting device 10, tube 20 and reflector 32 remain in rigidly fixed positions as schematically indicated at 44, i.e. they are not movable relative to each other along optical axis 16. LED module 12, by contrast, can be advanced and retracted along optical axis 16 (see double-headed arrow 46). By way of alternative, LED module 12 could be arranged in a fixed position, and the unit comprising reflector 32 and tube 20 as well as measuring plane 50 with detector 18 could be movable along optical axis 16. The front ends of the connection webs 38 of reflector 32 together with the recesses 40 of board 28 form the connection sites 48 between LED module 12 and optical unit 14.

After the application of the adhesive masses 42 and the relative adjustment of LED module 12 and optical unit 14 as shown in FIG. 1, LED 10 is driven to emit light. This light will be detected within the measuring plane 50 by detector 18. Subsequently, LED module 12 will be displaced until detector 18 detects a light intensity as required in the prescribed distance from the LED lighting device. When the two components are moved apart, the adhesive masses 42 will be "lengthened".

Let it be assumed that FIG. 2 shows that relative position of LED module 12 and optical unit 14 where detector 18 will measure the desired light intensity. As shown, LED module 12 and optical unit 14 have been connected to each other by the adhesive masses 42. Now, the adhesive masses 42 will be cured, which is indicated at 52 in FIG. 3 for the exemplary case where the adhesive masses 42 are to be cured by use of UV radiation. After the curing of the adhesive masses 42, the assembly process of the two components of LED lighting device 10, i.e. LED module 12 and optical unit 14, is concluded. What will follow are further production steps to provide the LED lighting device with a light disk and optionally with a housing, which is not illustrated in the drawing.

The invention has been explained above with reference to an embodiment wherein the LED lighting device is provided with a reflective optical unit realized in the form of said reflector 32. Instead of using a reflector, however, the LED lighting device can also be provided with a lens (refractive optical unit). Further, the LED lighting device can be mounted/assembled in the inventive manner together with an optical unit comprising reflectively and refractively operating optical elements.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A method for assembly of an LED lighting device comprising an LED module and an optical unit, which LED lighting device is configured as a reading or seat light for use in a vehicle such as an airplane, a train or a bus, said method comprising the steps of:
   arranging an optical unit and an LED module in a support for later fixation to each other, the LED module including at least one LED, and the optical unit having a reflector or a lens for illuminating a measuring plane by use of electromagnetic radiation from the LED module and with the aid of said reflector or lens,
   driving the LED module to cause it to emit electromagnetic radiation for illuminating the measuring plane,
   detecting at least a part of the electromagnetic radiation of the LED module that is incident on the measuring plane, by use of a detector arranged on the support,
   moving the LED module relative to the optical unit and/or the optical unit relative to the LED module along an optical axis, until the detector detects electromagnetic radiation of the LED module of a presettable intensity,
   fixing the optical unit and the LED module relative to each other in their current relative positions, and
   removing the thusly fixed optical unit and LED module from the support on which the detector is arranged.

2. The method according to claim 1 wherein, in the arrangement comprising the LED module and the optical unit, a curable adhesive mass is applied to mechanical contact sites between the LED module and the optical unit for later fixation of said components to each other, and wherein the LED module and the optical unit remain connected to each other by said adhesive mass when they are moved relative to each other along the optical axis.

3. The method according to claim 2 wherein said adhesive mass is curable by UV radiation and wherein said fixation of the LED module and the optical unit to each other is performed by subjecting said adhesive therebetween to UV radiation.

4. A method for assembling a lighting device having an optical unit and an LED for use where a specified intensity of electromagnetic radiation intensity is required at a specified distance from said LED comprising the steps of:
   preselecting an electromagnetic radiation intensity at a preselected distance;
   providing at least one LED for generating electromagnetic radiation along an optical axis;
   providing an optical unit coaxial with said optical axis, said optical unit have a first axial opening for receiving said electromagnetic radiation from said LED and a second axial opening opposite said first opening;
   providing a housing coaxial with said optical axis, said housing having a third axial opening for receiving electromagnetic radiation from said second axial opening and a fourth axial opening opposite said third axial opening;
   mounting a detector in said fourth axial opening coaxial with optical axis;
   causing said LED to emit electromagnetic radiation;
   moving said LED relative to said optical unit and/or moving said optical unit relative to said LED until the intensity of the electromagnetic radiation at said detector is substantially said preselected electromagnetic radiation intensity; and
   removing said housing.

* * * * *